(12) United States Patent
Cole et al.

(10) Patent No.: US 7,275,240 B2
(45) Date of Patent: Sep. 25, 2007

(54) METHOD AND SYSTEM FOR RECORDING MACROS IN A LANGUAGE INDEPENDENT SYNTAX

(75) Inventors: David Peter Cole, Issaquah, WA (US); Abraham Mathew, Mountlake Terrace, WA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 10/338,295

(22) Filed: Jan. 8, 2003

(65) Prior Publication Data

US 2004/0133878 A1 Jul. 8, 2004

(51) Int. Cl.
G06F 9/45 (2006.01)
(52) U.S. Cl. ............... 717/137; 717/121; 717/136; 717/147
(58) Field of Classification Search ........ 717/106–110, 717/137, 136, 121, 147; 704/8; 702/119; 709/205
See application file for complete search history.

(56) References Cited

U.S. PATENT DOCUMENTS

| | | | | |
|---|---|---|---|---|
| 6,092,037 | A * | 7/2000 | Stone et al. | 704/8 |
| 6,105,043 | A | 8/2000 | Francisco et al. | |
| 6,389,590 | B1 | 5/2002 | Miller et al. | |
| 6,405,365 | B1 * | 6/2002 | Lee | 717/106 |
| 6,480,856 | B1 | 11/2002 | McDonald et al. | |
| 6,481,008 | B1 | 11/2002 | Chaiken et al. | |
| 6,697,754 | B1 * | 2/2004 | Alexander | 702/119 |
| 2003/0018719 | A1 * | 1/2003 | Ruths et al. | 709/205 |
| 2004/0015843 | A1 * | 1/2004 | Quan | 717/110 |

OTHER PUBLICATIONS

Janeček, J., "Portable Application in Current Computing", ITAB '97, pp. 104-105.
Kazi, et al., "Techniques for Obtaining High Performance in Java Programs", AMC Computing Surveys, vol. 32, No. 3, Sep. 2000, pp. 213-240.
King, et al., "A Fortran Language System for Mutation-Based Software Testing", pp. 1-49.
Lee, et al., "Design of Translator for Generating Java Bytecode from Thread Code of Multithreaded Models" 5 pgs.
Cardelli, Luca, "The Amber Machine", found in: "Combination and Functional Programming Languages" G. Cousineau, P-L. Curien and B. Robinet Editors, Lecture Notes in Computer Science N.242, Springer-Veriag, 1986, pp. 1-28.
Offutt VI, et al., "A Fortran 77 Interpreter for Mutation Analysis", 1987, pp. 177-188.
Rothwell, Nick, "Functional Compilation for the Standard ML Core Language to Lambda Calculus", LFCS report ECS-LFCS-92-235, Sep. 10, 1992.

* cited by examiner

*Primary Examiner*—Meng-Al T. An
*Assistant Examiner*—Mark P. Francis
(74) *Attorney, Agent, or Firm*—Merchant & Gould

(57) ABSTRACT

An Object Instruction Language (OIL) provides a method for recording macros in a computer language independent syntax so that the macro can be converted into the source code of multiple computer languages without having to re-record the macro or translate the macro from the recorded language to an alternate language, thereby reducing the time needed to create macros for multiple computer languages, reducing the likelihood of error inherent in repeating a single task multiple times, and providing users of the software with an opportunity to record macros in the users' preferred language.

18 Claims, 6 Drawing Sheets

METHOD AND SYSTEM FOR RECORDING MACROS IN A LANGUAGE INDEPENDENT SYNTAX

FIELD OF THE INVENTION

The invention relates in general to macro recording systems within a computing environment. More particularly, the present invention relates to a method and system for creating macro instructions in a syntax that is independent of the computer language in which the macro will be eventually recorded, so that the macro can be processed into multiple languages of source code without having to recreate the macro.

BACKGROUND OF THE INVENTION

Computing devices are well-known in the art and widely used. For example, computing devices may take the form of a personal computer, a centralized computer terminal with computer terminal access, or a widely distributed system with computing devices connected to a network such as the Internet. Although some computing devices may operate with little or no human intervention, many computing devices require human input to operate. Computing devices, such as the personal computer, typically have a keyboard for inputting numerical and textual information.

Depending on the type of work performed by the computing device, the computing device may also have other types of inputs. For example, with the popularity of graphical user interfaces, the use of graphic input devices has dramatically increased. Graphical input devices include devices such as a computer mouse, graphics tablets, digitizers, and light pens. These devices allow a graphical element such as a cursor to be moved and positioned on a computer screen. This graphical element may be used to select functional commands to direct the operation of the computer or may assist in the input of information.

The aforementioned computer mouse is one of the most popular graphical input devices. The mouse connects to the computing device and is used to select commands and input graphical information. By moving the mouse across a surface, the relative movements of the mouse are communicated to the computing device, thereby moving the graphical cursor. Buttons on the mouse access and activate commands and input graphical information by placing the cursor.

Computing devices can also accept other forms of input from a user based on the application operating on the computing device, including voice input, input from digital cameras, input from video recorders, and input from other computing resources coupled via a local or wide area network connection to the computing device.

When operating a computing device, a user can interact with the input devices to direct the operation of the computing device. Many times the computing device requires the same series of inputs to perform a particular operation. Performing this set of repetitive operations may include several inputs from one or more input devices. For example, a particular operation may require a mouse action to initiate a program and then, textually input an access password with the keyboard. A keyboard, mouse, and other inputs are often needed to conclude the repetitive operation. Each time the user desires to perform this repetitive operation, the user must go through the same sequence using the same input devices. Not only is this time consuming, but the sequence may be prone to errors. In some situations, repetitive operations may be simplified with a macro.

Macros are used to automate repetitive keyboard, mouse, and other inputs in a particular application. In general, macros are typically files containing repetitive instructions. Once created, the macro may be replayed by the computing device. For example, many software applications have macro recording and playback capabilities. In these software applications, a user may record a macro to perform a particular operation or a series of operations and give that macro a name. Thereafter, that operation or the series of operations may be performed by executing that named macro, thereby saving the user the time and effort of repeating all of the steps of the macro. To run the macro, the software application typically has a macro playback facility, which can be initiated by command or through the use of a shortcut command.

With the current macro recorder technology, it is generally possible to record a macro in only one language, Visual Basic for Applications (VBA). However, many other programming languages exist which could otherwise be used to record and run macros. Furthermore, users prefer to record macros in the language of their choice, based on the user's personal preferences, skill, and proficiency level. In order to record macros in a language other than VBA, an application developer would have to rewrite the macro-recorder for each language within which a user desires to record macros. Such a process is not only expensive and time consuming, but can also be error-prone and lead to inconsistent behavior between macros recorded in different languages. Providing a method and system for recording a macro in multiple languages with minimal effort by the software application would save users and application developers time and money.

SUMMARY OF THE INVENTION

The inventive methods and system disclosed herein provide a means for recording a computer macro in a computer language independent syntax, thereby allowing a software application to record the instructions only once and then convert the instructions into a source code of any of a number of computer languages. Thus, one aspect of the present invention is to allow a user, wishing to record a macro in one or more different computer languages, to begin the recording of the macro by turning on a recording system in the computer system. The recording system typically comprises a macro recorder located in a macro recording engine. Both the macro recorder and the macro recording engine can be located inside of a software application on the computer system.

The user can then proceed by performing one or more actions, which the user desires to record on the computer system. The actions are typically performed on a software application residing in the computer system. These actions can include a sequence of commands or keyboard strokes occurring while the user is interacting with the software application. The actions are typically converted by the software application into a series of instructions called the instruction list having a computer language independent syntax. The instruction list typically represents a computer-readable interpretation of the actions implemented by the user and recorded by the recording system. The computer language independent syntax of the instructions can allow the instructions, once created, to be converted into one or more source codes of differing computer languages. The computer language independent syntax does not typically mirror the computer language used by the software application.

The instruction list typically contains both instructions and operands in either a one-to-one or a one-to-zero relationship respectively. The operand typically specifies the information that is to be operated on or manipulated. User actions are converted into the instruction list by the software application with the help of a builder, which can be located in the software application. The instructions are constructed in a computer language independent syntax. Once completed, the instruction list can be sent to one or more processors to be converted into source code of a particular computer language. Since the instruction list is written in a computer language independent syntax, the instruction list can be converted into different computer languages by different application developers and users based on developer and user preferences. For example, User A may choose to record the macro in Language A while User B may choose to record the macro in Language B. If both users record the same actions, then the same instruction list is generated using the language independent syntax, but the instruction list is processed by different processors into Language A and Language B. In another exemplary embodiment, it is possible that the instruction list created using the language independent syntax can be converted into multiple computer languages at one time without having to recreate the instructions and instruction list prior to being sent to each different processor.

BRIEF DESCRIPTION OF DRAWINGS

For a more complete understanding of the present invention and the advantages thereof, reference is now made to the following description in conjunction with the accompanying drawings in which.

DETAILED DESCRIPTION OF THE EXEMPLARY EMBODIMENTS

Figure 1A:
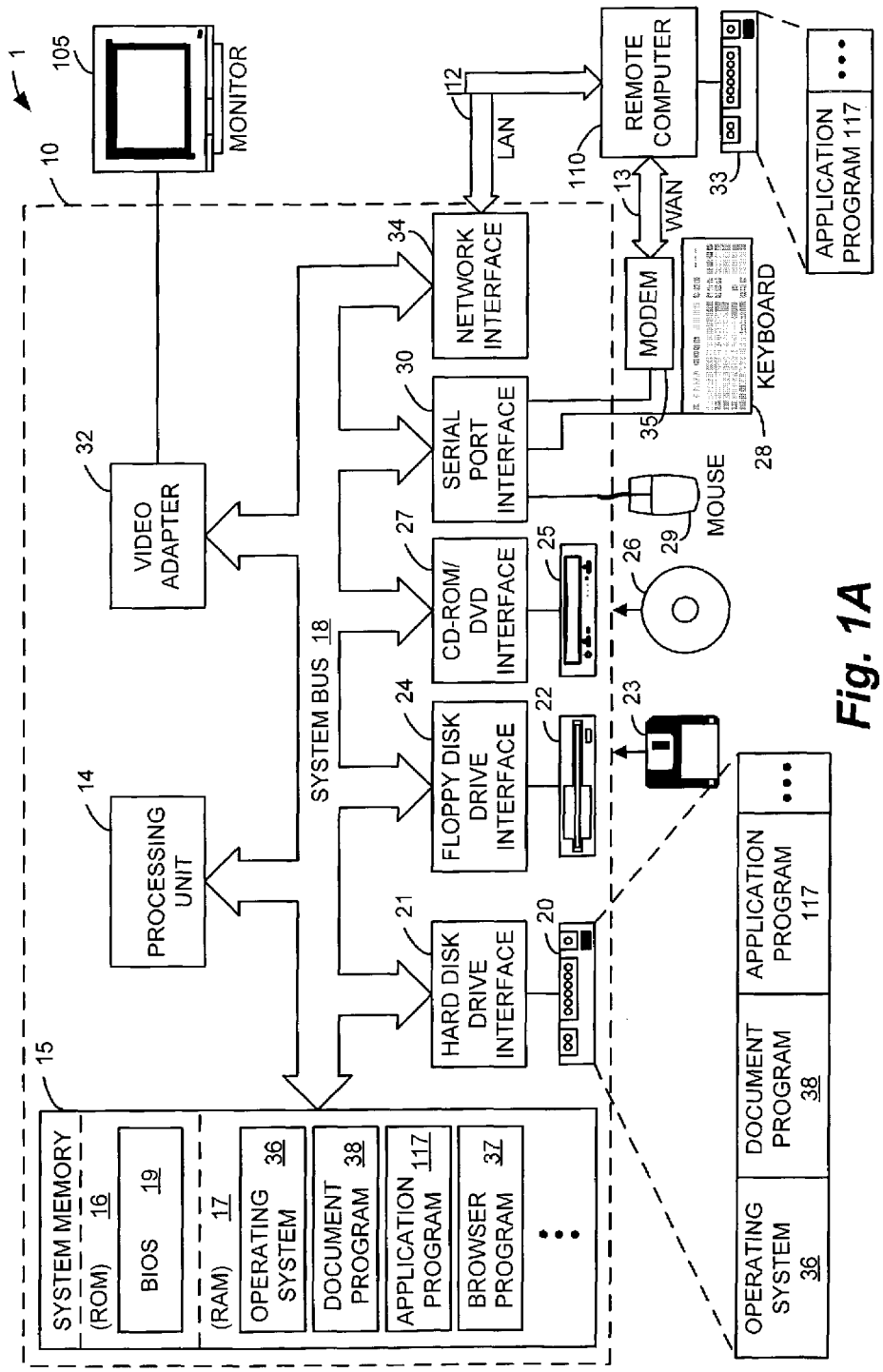
FIG. 1A is a block diagram illustrating an exemplary operating environment for implementation of various embodiments of the present invention.

The present invention supports a computer-implemented method for recording a macro in an object instruction language ("OIL") which is a computer language independent syntax. This independent syntax can be used to record a macro in one language and then implement it in a variety of other programming languages. The independent syntax of OIL assists programmers by converting the instruction steps of a macro in a specific language into a universal set of instructions that can be adapted to a variety of languages. Utilizing the OIL language, a programmer will not have to recreate the same macros in a variety of different languages. The inventions can be more readily understood by reference to the accompanying figures.

Although exemplary embodiments of the present invention will be generally described in the context of a software module and an operating system running on a personal computer, those skilled in the art will recognize that the present invention can also be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices and input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended flow charts (or logic flow diagrams). However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the present invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and an exemplary operating environment for the implementation of the present invention will be described.

FIG. 1A is a block diagram illustrating an exemplary operating environment 1 for implementation of various embodiments of the present invention. Those skilled in the art will appreciate that FIG. 1A and the associated discussion are intended to provide a brief, general description of one exemplary embodiment of computer hardware and program modules, and that additional information is readily available in appropriate programming manuals, user's guides, and similar publications.

The exemplary operating environment 1 illustrated in FIG. 1A includes a general-purpose computing device that can be in the form of a conventional personal computer 10. As shown in FIG. 1A, the personal computer 10 operates in a networked environment with logical connections to a remote server 110. The logical connections between the personal computer 10 and the remote server 110 are represented by a local area network 12 and a wide area network 13. Those of ordinary skill in the art will recognize that in this client/server configuration, the remote server 110 may function as a file server or computer server.

The personal computer 10 includes a processing unit 14, such as a "PENTIUM" microprocessor manufactured by Intel Corporation of Santa Clara, Calif. The personal computer also includes system memory 15, including read only memory (ROM) 16 and random access memory (RAM) 17, which is connected to the processor 14 by a system bus 18. An exemplary embodiment of the computer 10 utilizes a basic input/output system (BIOS) 19, which is stored in the ROM 16. Those skilled in the art will recognize that the BIOS 19 is a set of basic routines that helps to transfer information between elements of the personal computer 10. Those skilled in the art will also appreciate that the present invention may be implemented on computers having other architectures, such as computers that do not use a BIOS 19, and those that utilize other types of microprocessors for a processing unit 14.

Within the personal computer 10, a local hard disk drive 20 is connected to the system bus 18 via a hard disk drive interface 21. A floppy disk drive 22, which is used to read or write to a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27.

A user can enter commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, digitizer pens, head trackers, data gloves, and other devices suitable for positioning a cursor on a monitor 105. The monitor 105 or other kind of display device is connected to the system bus 18 via a video adapter 32.

As depicted in FIG. 1A, a number of program modules can be stored on ROM 16, RAM 17, hard disk 21, floppy disk 23, or CD-ROM/DVD disk 26, such as an operating system 36, an application program module 117, a browser program module 37, and a document program 38. Program modules include routines, sub-routines, programs, objects, components, data structures, etc., which perform particular tasks or implement certain abstract data types.

The remote server 110 in this networked environment is connected to a remote memory storage device 33. This remote memory storage device 33 is typically a large capacity device such as a hard disk drive, CD-ROM or DVD drive, magneto-optical drive or the like. Those skilled in the art will understand that program modules, such as an application program module 117, are provided to the remote server 110 via computer-readable media. The personal computer 10 is connected to the remote server 110 by a network interface 34, which is used to communicate over a local area network (LAN) 12.

In some embodiments, the personal computer 10 is also connected to the remote server 110 by a modem 35, which is used to communicate over a wide area network (WAN) 13, such as the Internet. The modem 35 is connected to the system bus 18 via the serial port interface 30. The modem 35 also can be connected to the public switched telephone network (PSTN) or community antenna television (CATV) network. Although illustrated in FIG. 1A as external to the personal computer 10, those of ordinary skill in the art can recognize that the modem 35 may also be internal to the personal computer 10, thus communicating directly via the system bus 18. It is important to note that connection to the remote server 11 via both the LAN 12 and the WAN 13 is not required, but merely illustrates alternative methods of providing a communication path between the personal computer 10 and the remote server 110.

Those skilled in the art will appreciate that program modules, such as the operating system 36, the application program module 117, the browser program module 37, and the document program 38 can be provided to the personal computer 10 via computer-readable media. In exemplary embodiments of the operating environment 1, the computer-readable media can include the local or remote memory storage devices, which may include the local hard disk drive 20, floppy disk 23, CD-ROM/DVD 26, RAM 17, ROM 16, and the remote memory storage device 33. In some exemplary embodiments of the personal computer 10, the local hard disk drive 20 is used to store data and programs.

Although other elements of the personal computer 10 and the operating environment 1 in general are not shown, those of ordinary skill in the art will appreciate that such components and the interconnection between them are known. Accordingly, additional details concerning the elements of the personal computer 10 and the operating environment 1 in general need not be disclosed in connection with the present invention for it to be implemented by those of ordinary skill in the art.

Figure 1B:
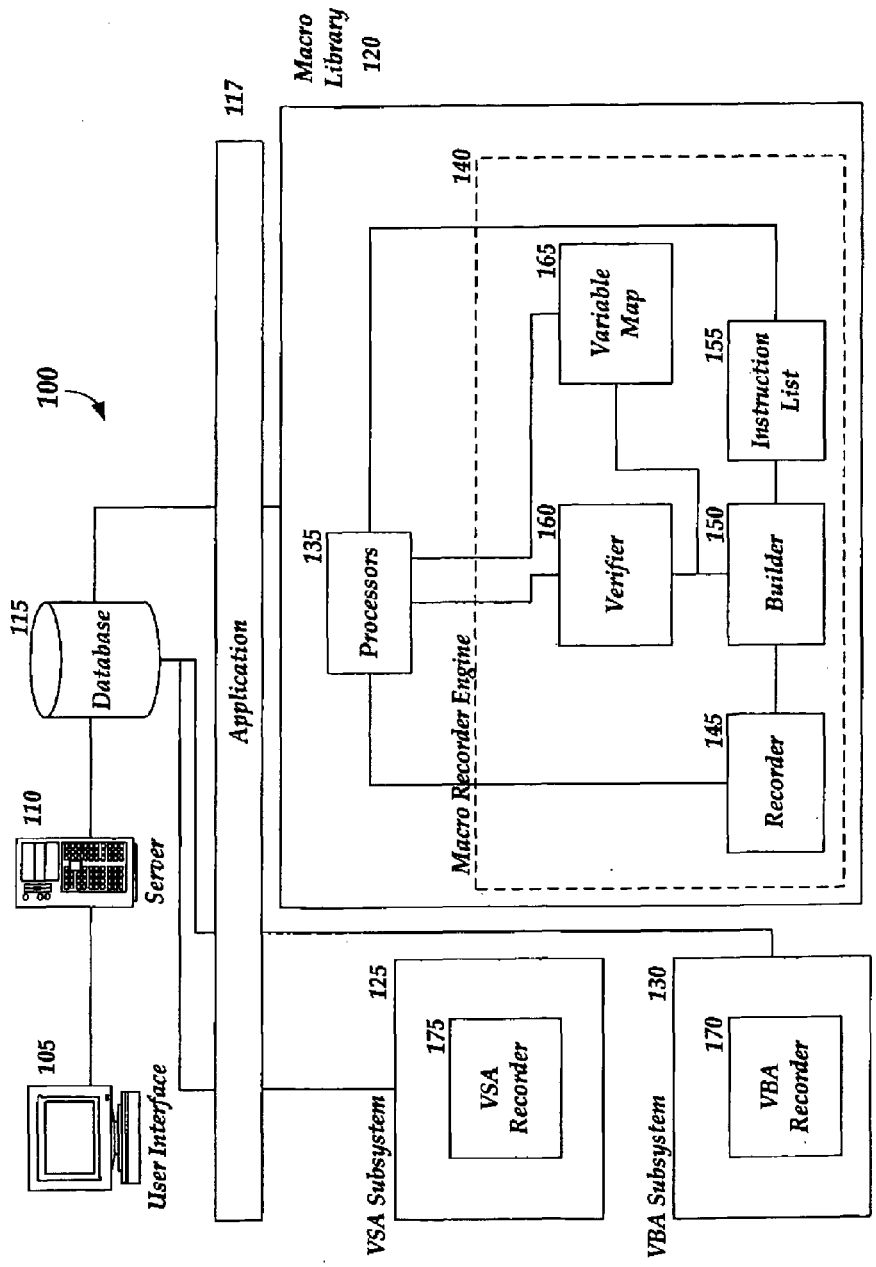
FIG. 1B is a block diagram of a macro building and recording system for recording macros in an object instruction language constructed in accordance with an exemplary embodiment of the present invention.

Referring to FIG. 1B, a block diagram is shown illustrating a macro building and recording system for recording macros in an OIL language 100 constructed in accordance with an exemplary embodiment of the present invention. The exemplary macro building and recording system 100 comprises a user interface 105, a server 110, a database 115, and an application 117. The application 117 comprises a macro library 120, a Visual Studio for Applications (VSA) subsystem 125, and/or a Visual Basic for Applications (VBA) subsystem 130. The macro library 120 comprises processors 135 and a macro recorder engine 140. The macro recorder engine 140 comprises a recorder 145, a builder 150, an instruction list 155, a verifier 160, and a variable map 165. The VSA subsystem 125 comprises a VSA recorder 175. The VBA subsystem 130 comprises a VBA recorder 170.

The user interface 105 is communicably attached via a computer network to the server 110. The user interface 105 provides a user with a means for communicating with the server 110, database 115, and application 117. For example, the user interface 105 can transmit information to the application 117 and the database 115 through the server 110, including data and queries. The user interface 105 can receive information from the database 115 and application 117 through the server 110. In one exemplary embodiment, the user interface 105 is a personal computer.

The server 110 is communicably attached via a computer network to the user interface 105 and the database 115. The server 110 typically represents a computer or a program that responds to commands from a user through a user interface 105.

The database 115 is communicably attached via a computer network to the server 110 and the application 117. The database 115 contains information related to software applications, language processors, and macro recorders. In one exemplary embodiment, the database 115 is a structured query language (SQL) server database.

The application 117 is a software application designed to assist the user in the performance of a specific task, including word processing, accounting, or inventory management.

The macro library 120 is a dynamic link library. In one exemplary embodiment, the macro library 120 is contained within the application 117, but the macro library 120 can reside independent of the application 117, allowing the macro library to be accessed by multiple applications 117. The processors 135 comprise one or more of a multitude of code processors including a C Plus Plus (C++) processor, a C Sharp (C#) processor, a VBA processor, and a Visual Basic.Net (VB.Net) processor. The processors 135 typically convert instructions received from the macro recorder engine 140 into language specific source code.

The recorder 145, builder 150, instruction list 155, verifier 160, and variable map 165 typically are component object model (COM) components. In one exemplary embodiment, the recorder 145, builder 150, instruction list 155, verifier 160 and variable map 165 reside within the application 117. However, in an alternate exemplary embodiment, these COM components can reside independent of the application 117, so that a multitude of applications 117 could access a single builder 150. The recorder 145 represents a program that records and stores macros created by a user's actions at the user interface 105. The builder 150 can create an empty instruction list 155, receive information from the recorder 145, build an instruction using language independent syntax, send the instruction to the verifier 160 and variable map 165 to ensure proper instruction construction, and add the instruction to the instruction list 155. The recorder 145 can then send the instruction list 155 to the processors 135 to convert the instruction list 155 into language specific source code.

The instruction list 155 is a list of instruction and operand pairs wherein the operand can be an optional part of the instruction depending on the format of the instruction. In one exemplary embodiment, the instruction list contains both instructions and operands in either a one-to-one or a one-to-zero relationship respectively. Once completed, the instruction list 155 typically contains a set of instructions in computer language independent syntax. The completed instruction list is sent to the processors 135 by the recorder 145. The verifier 160 determines if the instructions in the instruction list 155 contain the correct number and type of operands. For example, the verifier 160 can ensure that the processors 135 will not have a problem generating source code from the received instruction list 155. Once proper construction is determined, the verifier 160 sends the instruction back to the builder 150. The variable map 165 can receive an instruction from the builder 150, store the names and types of variables within the instruction, ensure that the user is not attempting to create a variable with the same name but different type, and return the instruction back to the builder 150.

The VSA subsystem 125 is a dynamic link library comprising a VSA recorder 175. The VSA recorder 175 typically receives macro source code from a VSA processor 135 and saves the source code within the VSA application 117 associated with the document in which the macro is created.

The VBA subsystem 130 is a dynamic link library comprising a VBA recorder 170. The VBA recorder 170 typically receives macro source code from a VBA processor 135 and saves the source code within the VBA application 117 associated with the document in which the macro is created. In one exemplary embodiment, the intent of the system 100 is to generate an instruction list 155 that targets a processing stack where each instruction has the correct type and number of corresponding operands.

Figure 2:
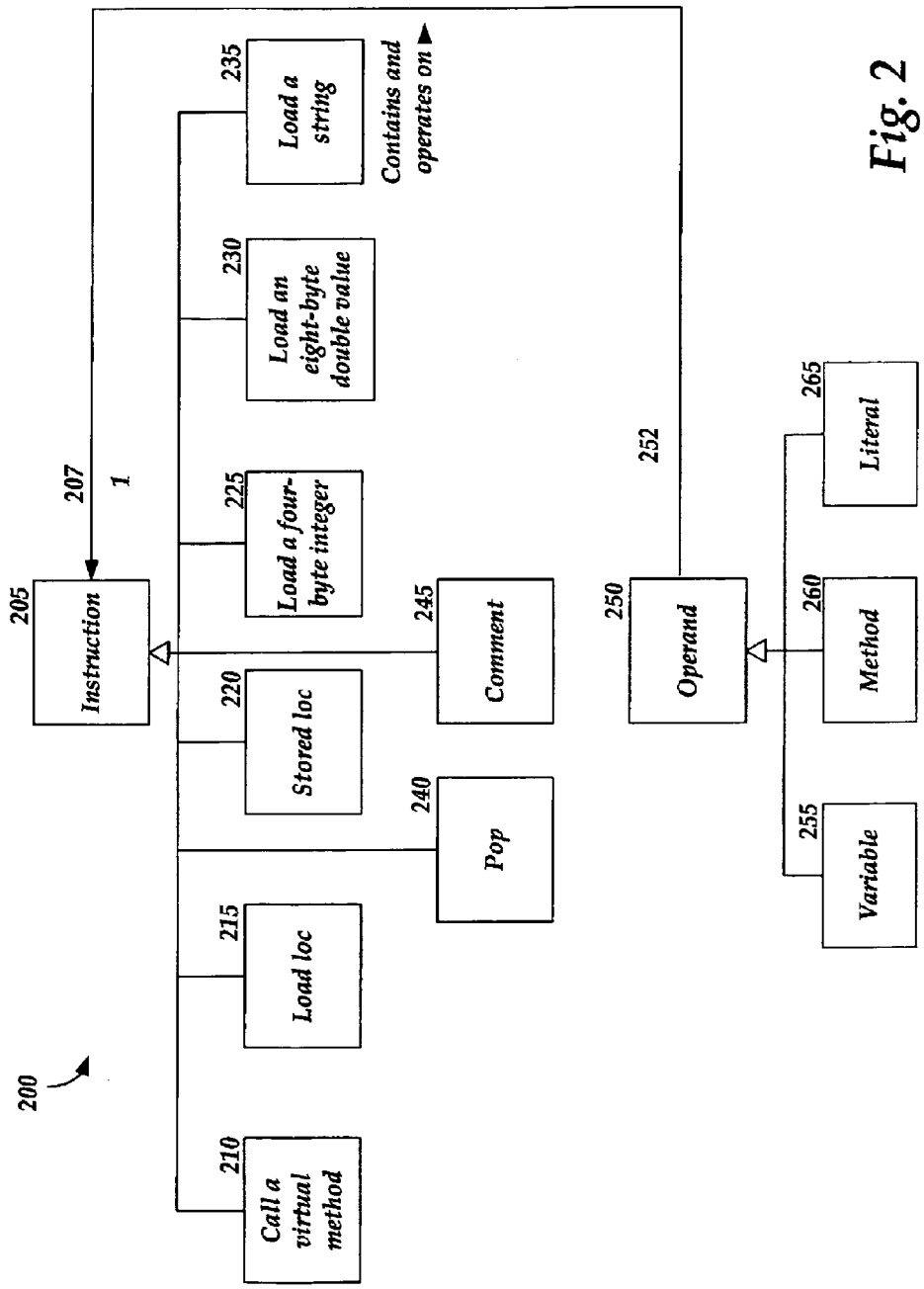
FIG. 2 is a block diagram of a unified modeling language diagram illustrating the construction of an instruction list using an object instruction language in accordance with an exemplary embodiment of the present invention.

FIG. 2 is a unified modeling language (UML) diagram presented to illustrate the internal structure of an instruction list 200, created using a computer language independent syntax, constructed in accordance with an exemplary embodiment of the present invention. Now referring to FIGS. 1B and 2, the exemplary instruction list 200 comprises instructions 205 and operands 250 residing in the instruction list 155 of the builder 150. The instruction 205 comprises callvirt 210, ldloc 215, stloc 220, ldc_i4 225, ldc_r8 230, ldstr 235, pop 240, and comment 245. The operand 250 comprises variable 255, method 260, and literal 265. The diamond 207 and the designation 0.1 252 typically represents that either zero or one operand 250 is associated with each instruction 205 in the instruction list 155.

Variable 255 is a type of operand 250 and is typically defined as a named storage location capable of containing data that can be modified during program execution. Method 260 is a type of operand 250 defined as a process performed by an object when it receives a message. Literal 265 is a type of operand 250 defined as a value, used in an application 117, that is expressed as itself rather than as a variable's value or the result of an expression. For example, the number "25", the character "a", and the string "hello" are all examples of literals 265.

The instruction callvirt 210 represents a call for a virtual method. Callvirt 210 takes a method 260 as its operand 250. Callvirt 210 also requires that any arguments associated with the method 260 have already been placed on a processing stack. The processing stack is used during the processing of the instruction list 155, with the size of the processing stack going up and down as the instruction list 155 is processed. In one exemplary embodiment, some instructions in the instruction list 155 place elements onto the processing stack, some take elements off of the processing stack, and some instructions leave the processing stack alone. Callvirt 210 then consumes the arguments off the processing stack and executes the method 260. If the method 260 returns anything, callvirt 210 pushes the returned information back onto the processing stack. Ldloc 215 represents the act of loading a local variable, which takes the variable 255 referred to by ldloc's 215 instruction and pushes the variable 255 onto the processing stack for consumption by something else, either another store operation or a call. Stloc 220 represents the act of storing a local variable, which takes a value that is on the processing stack and assigns the value into a variable 255.

Ldc_i4 225 represents the loading of a four byte integer onto the processing stack and takes a literal 265 as its corresponding operand. For example, if the instruction 205 ldc_i4 225 were used, it would have to take numbers including 4, 8, and 12. Ldc_r8 230 represents load an eight byte double value onto the processing stack. Like ldc_i4 225, ldc_r8 takes a literal 265 as its corresponding operand. Ldstr 235 loads a string onto the stack and takes a literal 265 as its corresponding operand 250. Pop 240 does not take a corresponding operand, but rather, just discards whatever operand 250 is on top of the processing stack at the time the pop instruction 240 is given. The comment instruction 245 takes a literal 265 and submits it as a string in a comment. The processor 135 may modify the string to put it into the appropriate format for the language.

Those skilled in the art will appreciate that the instructions shown as a part of the instruction list 200 are only a small subset of the total possible set of instructions, including arithmetic and logical instructions, which can be processed using the language independent syntax.

Figure 3:
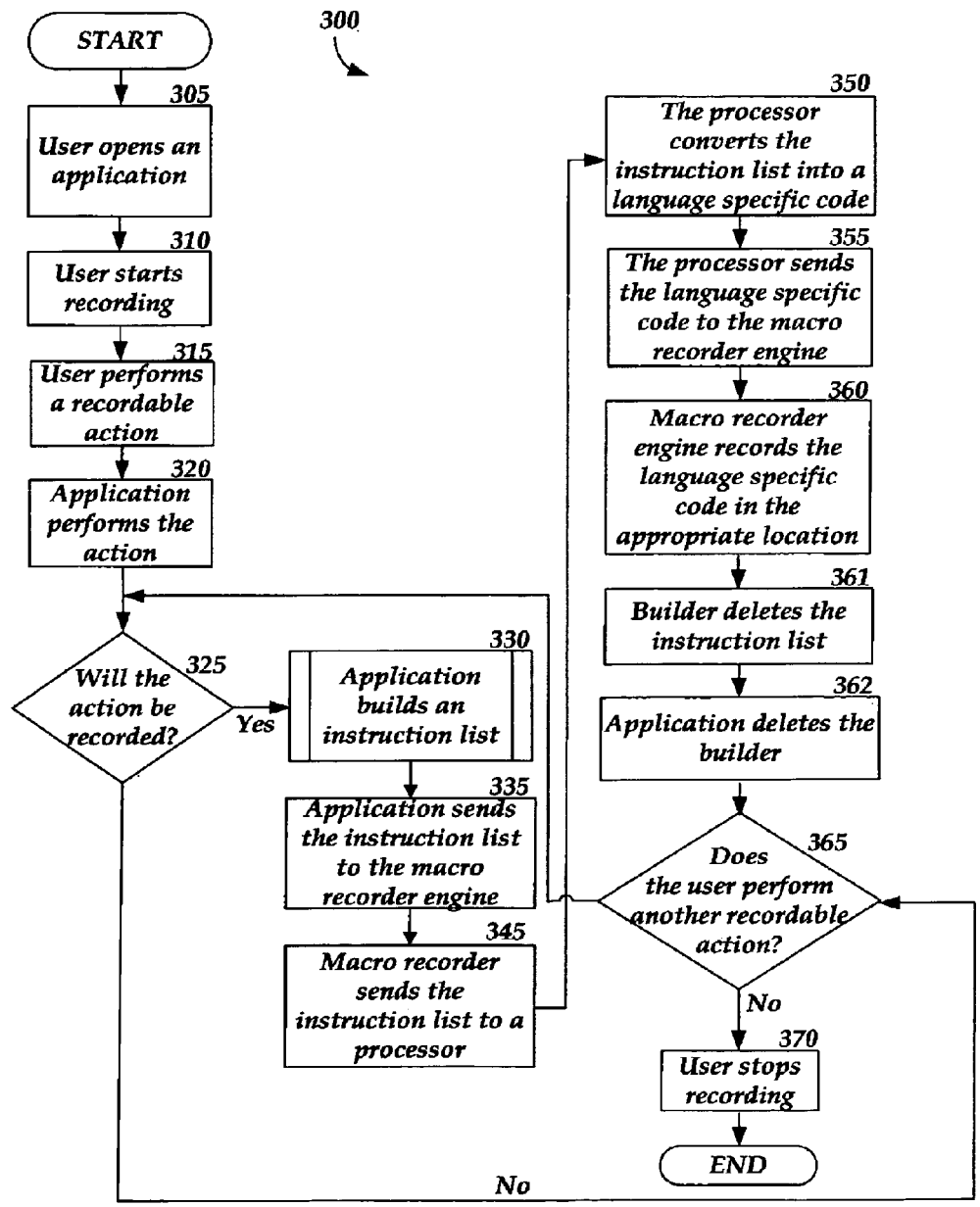
FIG. 3 is a flow chart illustrating a process for recording a macro using an object instruction language in accordance with an exemplary embodiment of the present invention.
Figure 4:
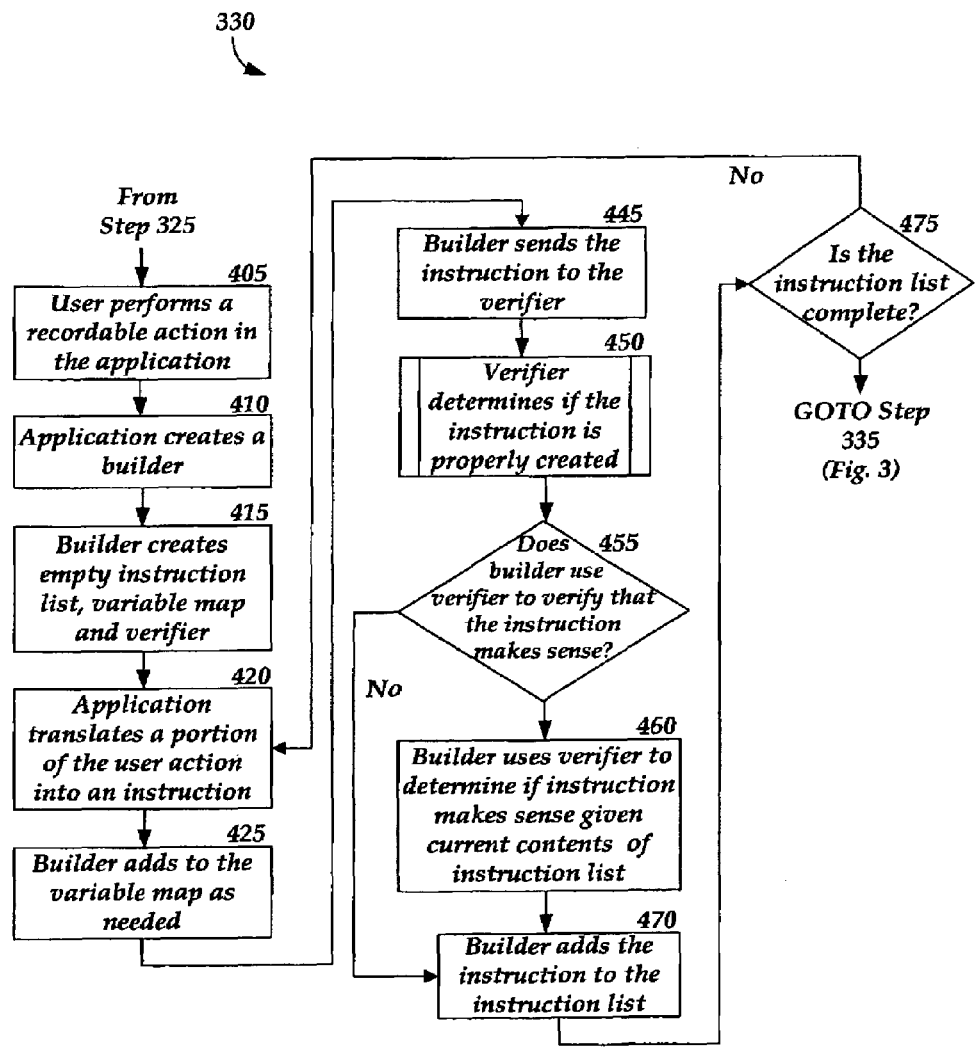
FIG. 4 is a flow chart illustrating a process for creating an instruction list for a macro using an object instruction language in accordance with an exemplary embodiment of the present invention.
Figure 5:
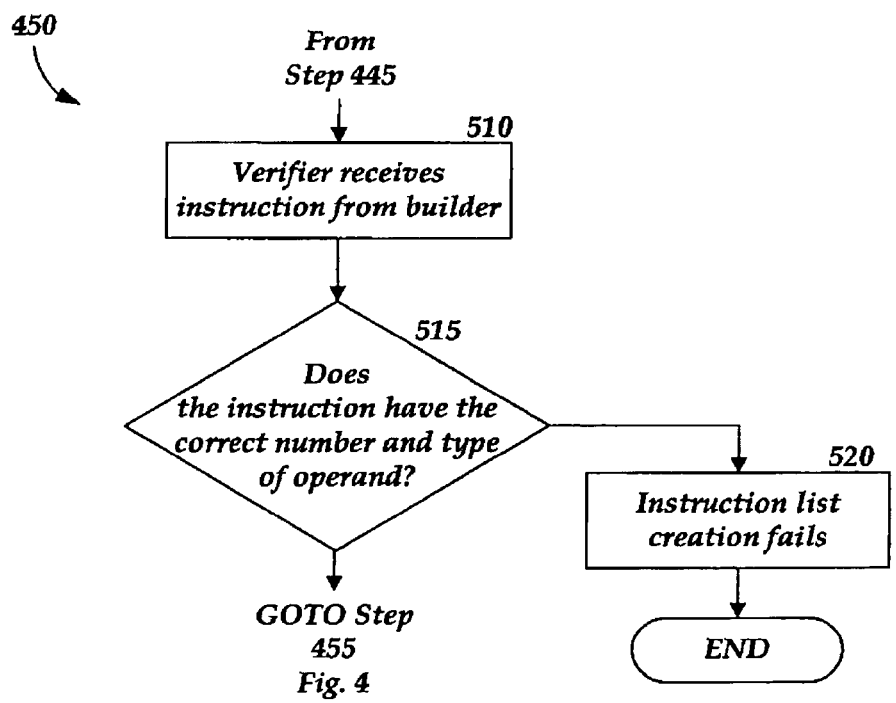
FIG. 5 is a flow chart illustrating a process for verifying proper construction of an instruction written in an object instruction language in accordance with an exemplary embodiment of the present invention.

FIGS. 3–5 are logical flowchart diagrams illustrating the computer-implemented processes completed by an exemplary method for recording a macro in a computer language independent syntax. FIG. 3 is a logical flowchart diagram 300 presented to illustrate the general steps of an exemplary process for recording a macro in a computer language independent syntax within the operating environment of the exemplary macro recording system 100 of FIG. 1.

Now referring to FIGS. 1B and 3, the exemplary method 300 begins at the START step and proceeds to step 305, in which a user opens an application 117 from a user interface 105. The user interface 105 typically represents a point from which the client can access the application 117 through the server 110 and database 115. The user typically opens the application 117 by selecting an icon corresponding to the application 117 on a monitor at the user interface 105.

In step 310, the user starts recording a macro. In one exemplary embodiment, the user begins recording a macro by selecting "record macro" from a drop-down box in the application 117. A dialog box may then appear so that the user can name the macro to be recorded, choose where to store the macro in the database 115 and provide a brief description of the macro, such as the purpose for creating the macro or the macro's function. Once the user has completed the description of the macro, the user can close the dialog box and the application 117 begins recording the macro.

In step 315, the user performs a recordable action and the application 117 performs the recordable action in step 320. A recordable action is any operation the user makes in the application 117, including a keystroke, a selection of data from a particular area of the application 117, or a mathematical determination. In step 325, an inquiry is conducted to determine if the recordable action, performed by the user, will be recorded. If not, the "NO" branch is followed to step 365, where another inquiry is conducted to determine if the user performs another recordable action. If the action will be recorded, the "YES" branch is followed to step 330.

In step 330, the application 117 builds an instruction list 155 in the macro recorder engine 140. The instruction list 155 typically contains a series of instructions outlining the operation of the macro in a computer language independent syntax. The instructions are an interpretation of the user's recorded actions in a computer language independent syntax. In step 335, the application 117 sends the instruction list 155 to the macro recorder engine 140. The macro recorder engine 140 sends the instruction list 155 to one or more processors 135 in step 345. The determination of when to send the instruction list 155 to one or more processors 135 is typically determined by the application 117. For example, once a user completes an action which will generate a corresponding line of source code, the application 117 will generally send the instruction list 155, created from the user's action, to the processor 135. The processor 135 can reside inside or outside the application 117 and can include processors 135 capable of generating code in multiple computer languages, such as C++, C#, VBA, and VB.Net. The macro recorder 145 can send a single instruction list 155 to one or more processors 135 in step 345 to generate one or more types of language specific source code based on the user's intended use of the macro and the user's language preference.

In step 350, the processor 135 converts the instruction list 155 from the computer language independent syntax into a language specific source code, such as C++, C#, VBA, or VB.Net. The processor 135 sends the language specific source code to the macro recorder engine 140, in step 355. In step 360, the macro recorder engine 140 saves the language specific source code in an appropriate location. In one exemplary embodiment, appropriate locations for saving source code include the database 115, the VSA subsystem 125, the VBA subsystem 130 or the application 117. For example, the recorder 145 can send the instruction list 155 to a VBA processor 135 to process the instruction list 155 into VBA code. Once processed, the VBA code is sent to the macro recorder engine 140, which then sends the VBA code to the VBA recorder 170 in the VBA subsystem 130. In one exemplary embodiment, the application 117 determines the appropriate location and presents the choices to the user through the user interface 105. The user then decides on the appropriate location based on the choices provided. In step 361, the builder 150 deletes the instruction list 155. The application 117 deletes the builder 150 in step 362.

In step 365, an inquiry is conducted to determine if the user has performed another recordable action in the application 117. If so, the "YES" branch is followed to step 325 to determine if the action will be recorded. If the user does not perform another recordable action, the "NO" branch is followed to step 370. In step 370, the user stops recording the macro in the application 117. The user can stop recording the macro by selecting "stop recording macro" from a drop-down box in the application 117, appearing on the monitor of the user interface 105. The macro is now in a language specific code and can be accessed by the user in the application 117. The method 300 then terminates at the END step.

FIG. 4 is a logical flowchart diagram illustrating an exemplary computer-implemented method for building an instruction list 155 in a computer language independent syntax as completed by step 330 of FIG. 3. Referencing FIGS. 1B, 3, and 4, the method 330 is initiated with the user performing a recordable action in the application 117 in step 405. In step 410, the application 117 creates a builder 150 in the macro recorder engine 140. The builder 150 is typically created for each recorded user action in the application 117. However, in an alternate exemplary embodiment, the builder 150 can be reset with an empty instruction list 155 after a previous instruction list 155 is processed by the processor 135, thereby eliminating the necessity of creating a new builder 150 for each recorded user action.

The builder 150 creates an empty instruction list 155, variable map 165, and verifier 160 in the macro recorder engine 140 in step 415. The instruction list 155, variable map 165, and verifier 160 are typically created for each recordable user action in the application 117. However, in an alternate exemplary embodiment, the instruction list 155, variable map 165, and verifier 160 can be reset and the instruction list 155 emptied after the instruction list 155 is processed by the processor 135, thereby eliminating the necessity of creating a new instruction list 155, variable map 165, and verifier 160 for each recorded user action.

In step 420, the application 117 translates a portion of the recorded user action into an instruction having a computer language independent syntax. The builder 150 adds information from the instruction to the variable map 165 as needed in step 425. Information will be added to the variable map 165 from the builder 150 if the instruction contains a variable not previously used in an earlier instruction. In step 445, the builder 150 sends the instruction to the verifier 160. The verifier 160 determines if the instruction is properly created in step 450. To determine if the instruction is properly created, the verifier 160 examines the code of the instruction to verify proper code construction including a determination of whether or not the instruction contains the correct type and number of operands or the proper type of information to execute a call.

In step 455, an inquiry is conducted to determine if the builder 150 uses the verifier 160 to determine if the current instruction is properly constructed with respect to the current contents of the instruction list 155. If so, the "YES" branch is followed to step 460, where builder 150 uses the verifier 160 to determine if the instruction makes sense given the current contents of the instruction list 155. The process then continues to step 470. If the builder 150 does not use the verifier 160 to determine if the current instruction is properly constructed with respect to the current contents of the instruction list 155, the "NO" branch is followed to step 470. In step 470, the builder 150 adds the instruction to the instruction list 155.

In step 475, an inquiry is conducted to determine if the instruction list 155 is complete. If not, the "NO" branch is followed to step 420, where the application 117 translates another portion of the user actions into instructions having a computer language independent syntax. If the instruction list 155 is complete, the "YES" branch is followed to step 335 of FIG. 3.

FIG. 5 is a logical flowchart diagram illustrating an exemplary computer-implemented method for a verifier 160 determining if an instruction is properly created as completed by step 450 of FIG. 4. Referencing FIGS. 1B, 4, and 5, the method 450 is initiated with the verifier 160 receiving an instruction from the builder 150 in step 510. In step 515 an inquiry is conducted to determine if the instruction, received by the verifier 160, contains the correct number and type of operands. If not, the "NO" branch is followed to step 520 where the instruction list 155 creation fails and the process ends. If the instruction contains the correct number and type of operands, the "YES" branch is followed to step 455 of FIG. 4.

In conclusion, the present invention enables users and developers to create and employ macros in a variety of different programming languages. By using the language independent syntax of OIL, a macro can be created in one language and does not have to be created separately in other languages. Instead, the OIL language converts the instructions of the original macro to a set of neutral instructions that can be converted into a variety of different languages.

It will be appreciated that the present invention fulfills the needs of the prior art described herein and meets the above-stated objectives. While there have been shown and described several exemplary embodiments of the present invention, it will be evident to those skilled in the art that various modifications and changes may be made thereto without departing from the spirit and the scope of the present invention as set forth in the appended claims and equivalence thereof. For instance, the methods of the present invention could be applied to computer-readable instruction beyond those typically described as macros.

We claim:

1. A computer-implemented method for recording instructions in a computer language independent syntax, comprising the steps of:
   accepting a request to record at least one action in a computer system;
   initiating a recording system in the computer system to record at least one action;
   accepting an at least one action performed on the computer system;
   recording the at least one action performed on the computer system with the recording system;
   converting the at least one action recorded with the recording system into an at least one instruction having a computer language independent syntax;
   converting the at least one instruction having a computer language independent syntax into an instruction list having a computer language independent syntax, wherein the instruction list comprises an operand such that the operand is defined as a named storage location capable of being modified;
   accepting the instruction;
   verifying whether code of the instruction is constructed properly wherein verifying whether code of the instruction is constructed properly comprises determining whether the instruction contains a correct number of operands to execute a call;
   in response to verifying that the code is constructed properly, querying whether a verifier evaluates the instruction to determine if the instruction makes sense based on contents of the instruction list;
   determining if the instruction makes sense based on the contents of the instruction list; and
   converting the instruction list into one of a plurality of source code languages that is ready for executing the call.

2. The method of claim 1 further comprising the steps of: determining if another action comprising at least one instruction is accepted by the computer system;
   accepting a request to cease recording; and
   terminating the recording by the recording system.

3. The method of claim 1, wherein the step of converting the at least one instruction into an instruction list having a computer independent syntax comprises the steps of:
   creating an instruction list;
   translating at least one action performed on the computer system into an instruction having a computer language independent syntax;
   adding the instruction having the computer language independent syntax to an instruction list comprising at least one instruction having the computer language independent syntax,
   sending the instruction list comprising at least one instruction having the computer language independent syntax to at least one of a plurality of processors; and
   processing the instruction list comprising at least one instruction having the computer language independent syntax into a language specific source code in the at least one of a plurality of processors.

4. The method of claim 3, wherein verifying whether code of the instruction is constructed properly comprises determining whether the instruction contains a correct type of operand to execute a call and wherein the determination of whether the instruction makes sense based on the contents of the instruction list is made based on a positive determination that the verifier evaluates the instruction to determine if the instruction makes sense.

5. The method of claim 3, wherein the instruction list is created by a builder residing in a software application for each macro recorded.

6. The method of claim 1, wherein the builder is created by the software application for each macro recorded.

7. The method of claim 3 wherein the builder creates the verifier, a variable map and the instruction list for each macro to be recorded in the software application.

8. The method of claim 1, wherein a source code emitted in the one of a plurality of source code languages in response to the at least one action comprises a macro.

9. The method of claim 1 wherein the one of a plurality of source code languages is created in at least one of a plurality of processors.

10. The method of claim 1, wherein the instruction list comprises:
    an at least one instruction which can be recognized by a processor and converted into source code in a computer system; and
    an operand specifying the information upon which the instruction operates or manipulates in the computer system.

11. A computer-readable medium having computer-executable instructions for performing the steps recited in claim 1.

12. A system for recording instructions in a computer language independent syntax comprising:
    a user interface;
    a server coupled to the user interface;
    a recorder coupled to a database coupled to the server, the recorder operable to record actions initiated at the user interface;
    a builder coupled to the recorder, operable for receiving the recorded actions from the recorder and generating an at least one instruction based on the recorded action;
    an instruction list coupled to the builder, operable for receiving the at least one instruction generated from the builder;
    at least one of a plurality of processors coupled to the builder, operable for receiving the instruction list and generating at least one source code;
    a software application coupled to the database and a plurality of dynamic link libraries; and
    a verifier coupled to the builder and the at least one of a plurality of processors, the verifier operable to:
        verify that the instruction list is properly constructed by determining whether the instruction contains at least one of a correct type of operand or a correct number of operands to execute a call;
        in response to verifying that the code is constructed properly, query whether the verifier evaluates the instruction to determine if the instruction makes sense based on contents of the instruction list;
        determine if the instruction makes sense based on the contents of the instruction list; and
        convert the instruction list into one of a plurality of source code languages that is ready for executing the call.

13. The system of claim 12 further comprising
    a variable map coupled to the builder and the at least one of a plurality of processors, operable for evaluating the instruction list for variables contained in the instructions.

14. The system of claim 13, further comprising a subsystem for receiving the generated source code and storing the generated source code until needed.

15. The system of claim 12, wherein the builder is located in the software application.

16. The system of claim 12, wherein the builder is coupled to a plurality of software applications, capable of building instructions in a computer language independent syntax for the plurality of software applications.

17. A computer-readable medium having instructions when executed by a processor for performing a method of recording instructions in a computer language independent syntax, the method comprising:
    accepting a request to record at least one action in a computer system;
    initiating a recording system in the computer system to record at least one action;
    accepting at least one action performed on the computer system;
    converting the at least one action performed on the computer system into at least one instruction having a computer language independent syntax;
    converting the at least one instruction into an instruction list having a computer language independent syntax;
    accepting the instruction;
    determining whether the instruction contains a correct number of operands to execute a call;
    in response to determining that the instruction contains the correct number of operands to execute a call, querying whether a verifier evaluates the instruction to determine if the instruction makes sense based on the contents of the instruction list;
    based on a positive determination that the verifier evaluates the instruction to determine if the instruction makes sense, determining whether the instruction makes sense based on contents of the instruction list; and
    converting the instruction list having the computer language independent syntax into one of a plurality of source codes that is ready for executing the call.

18. The computer-readable medium of claim 17, further comprising determining whether the instruction contains a correct type of operand to execute a call;
    in response to determining that the instruction contains the correct number of operand to execute a call, querying whether the verifier evaluates the instruction to determine if the instruction makes sense based on the contents of the instruction list.

* * * * *